(12) United States Patent
Haskins et al.

(10) Patent No.: US 12,261,467 B1
(45) Date of Patent: Mar. 25, 2025

(54) CHARGER SYSTEM FOR PORTABLE ELECTRONIC DEVICES

(71) Applicant: Pioneer Square Brands, Inc., High Point, NC (US)

(72) Inventors: William Miles Haskins, Kernersville, NC (US); Riley Edwin Lynch, Greensboro, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 18/929,385

(22) Filed: Oct. 28, 2024

(51) Int. Cl.
*H02J 7/00* (2006.01)

(52) U.S. Cl.
CPC .......... *H02J 7/0047* (2013.01); *H02J 7/0013* (2013.01); *H02J 7/0044* (2013.01)

(58) Field of Classification Search
CPC ...... H02J 7/0047; H02J 7/0013; H02J 7/0044; G01D 3/00; G12B 11/00
USPC ................. 362/23.01, 23.07, 23.02
See application file for complete search history.

(56) References Cited

U.S. PATENT DOCUMENTS

| | | | |
|---|---|---|---|
| 2015/0162781 A1* | 6/2015 | Fratti | H02J 7/0013 320/101 |
| 2015/0326060 A1* | 11/2015 | Young | H02J 50/80 320/108 |
| 2017/0271900 A1* | 9/2017 | Rose | H02J 7/0044 |
| 2024/0055905 A1* | 2/2024 | Novorita | A61B 90/98 |

* cited by examiner

*Primary Examiner* — Edwyn Labaze
(74) *Attorney, Agent, or Firm* — Grandview Law

(57) ABSTRACT

A portable electronic device charger system includes (I) electrical interface electrically couplable with the at least one portable electronic device; (II) electronic control assembly for controlling electrical charging of the portable electronic device accessory with the portable electronic device when the portable electronic device is electrically coupled with the electrical interface; (III) light emitting assembly configured to project amount of light when activated by the electronic control assembly; and (IV) a base assembly, wherein the light emitting assembly is positioned to project at least a majority of the amount of light in a direction onto a horizontally oriented surface when the base of the portable electronic device accessory system is positioned upon the horizontally oriented surface. Other aspects are described in the claims, drawings, and text forming a part of the present disclosure.

16 Claims, 11 Drawing Sheets

CHARGER SYSTEM FOR PORTABLE ELECTRONIC DEVICES

SUMMARY

In one or more aspects a portable electronic device charger system for electrical charging of at least a first portable electronic device, includes (I) a first electrical interface electrically couplable with the first portable electronic device; (II) a first electronic control assembly for controlling electrical charging of the portable electronic device charger system with the first portable electronic device when the first portable electronic device is electrically coupled with the first electrical interface; (III) a first direct light emitter assembly containing a first direct light emitter configured to emit direct light in at least a portion of the visible light spectrum when activated by the first electronic control assembly; and (IV) a base assembly, wherein when the portable electronic device charger system is positioned upon a first portion of a horizontally oriented surface and when the first direct light emitter is activated, the direct light of the first direct light emitter is emitted onto a second portion of the horizontally oriented surface to illuminate the second portion wherein the first portion and a third portion of the horizontally oriented surface adjacent to the second portion remain unilluminated by the direct light being emitted by the first direct light emitter.

In implementations the first direct light emitter of the first direct light emitter assembly includes a direct light emitting diode.

Implementations further include (I) at least one second electrical interface electrically couplable with at least one second portable electronic device; (II) at least one second electronic control assembly for controlling electrical charging of the portable electronic device charger system with the at least one second portable electronic device when the at least one second portable electronic device is electrically coupled with the at least one second electrical interface; and (III) at least one second direct light emitter assembly containing at least one second direct light emitter configured to emit direct light in at least a portion of the visible light spectrum when activated by the at least one electronic control assembly.

In implementations the first electronic control assembly is configured to control the direct light emitted by the first direct light emitter based on the electrical charging of the portable electronic device charger system with the first portable electronic device.

In implementations the first electronic control assembly is configured to control the direct light emitted by the first direct light emitter based on electrical charging status of the first portable electronic device being electrically charged by the portable electronic device charger system.

In implementations the first electronic control assembly is configured to control color of the direct light emitted by the first direct light emitter based on status of electrical charging by the portable electronic device charger system of the first portable electronic device.

In implementations the first electronic control assembly is configured for controlling electrical charging of the first portable electronic device when the first portable electronic device is electrically coupled with the first electrical interface.

Implementations further include a side having an exterior surface and an interior surface, wherein the side includes an aperture extending from an opening through the interior surface through to an opening through the exterior surface downward away from a horizontal orientation in a direction toward the second portion of the horizontally oriented surface when the base of the portable electronic device charger system is positioned upon the first portion of horizontally oriented surface, and wherein the first direct light emitter is sized and shaped to couple with the aperture.

In implementations further include a side having an exterior surface and an interior surface, wherein the side includes an aperture extending from an opening through the interior surface through to an opening through the exterior surface, and wherein the opening through the interior surface is distanced farther away from the base assembly than the opening through the exterior surface is distanced from the base assembly, and wherein the first direct light emitter is sized and shaped to couple with the aperture.

In implementations the first direct light emitter assembly includes at least one catch portion removably couplable with the interior surface of the side.

In implementations the first direct light emitter assembly is adjustably positionable to adjust location of the second portion of the horizontally oriented surface when the portable electronic device charger system is positioned upon a first portion of a horizontally oriented surface.

In implementations the first direct light emitter assembly is positioned to emit the direct light at least 30 degrees downward from horizontal when the base of the portable electronic device charger system is positioned upon the first portion of the horizontally oriented surface.

In implementations the first direct light emitter emits direct light as collimated light when activated by the first electronic control assembly.

In implementations the first direct light emitter includes at least one lens configured to emit the direct light when activated by the first electronic control assembly as focused light.

In one or more aspects a portable electronic device charger system for electrical charging of at least one portable electronic device includes (I) at least one electrical interface electrically couplable with the at least one portable electronic device; (II) at least one electronic control assembly for controlling electrical charging of the portable electronic device charger system with the at least one portable electronic device when the at least one portable electronic device is electrically coupled with the at least one electrical interface; (III) at least one direct light emitter assembly configured to project at least one amount of light when activated by the at least one electronic control assembly; and (IV) a base assembly, wherein the at least one direct light emitter assembly is positioned to project at least a majority of the at least one amount of light in a direction onto a first portion of a horizontally oriented surface when the base of the portable electronic device charger system is positioned upon a second portion of the horizontally oriented surface.

Implementations further include a side having an exterior surface and an interior surface, wherein the side includes at least one aperture extending from at least one opening through the interior surface through to at least one opening through the exterior surface, and wherein the at least one opening through the interior surface is distanced farther away from the base assembly than the at least one opening through the exterior surface is distanced from the base assembly, wherein the at least one direct light emitter assembly is sized and shaped to couple with the at least one aperture.

In implementations the at least one direct light emitter assembly is adjustably positionable to adjust location of the at least a majority of the at least one amount of light projected onto the first portion of the horizontally oriented surface when the base of the portable electronic device charger system is positioned upon the second portion horizontally oriented surface.

In one or more aspects a portable electronic device charger system for electrical charging of at least one portable electronic device includes (I) at least one electronic control assembly for controlling electrical charging of the portable electronic device charger system with the at least one portable electronic device; and (II) at least one direct light emitter assembly configured to project at least one amount of light when activated by the at least one electronic control assembly, wherein the at least one direct light emitter assembly is positioned to project at least a majority of the at least one amount of light in a direction onto a first portion of a horizontally oriented surface when the base of the portable electronic device charger system is positioned upon a second portion of the horizontally oriented surface.

In implementations the at least one direct light emitter assembly is positioned to emit the at least one amount of light at least 30 degrees from horizontal when the base of the portable electronic device charger system is positioned upon the horizontally oriented surface.

In implementations the at least one direct light emitter assembly is configured to project the at least one amount of light when activated by the at least one electronic control assembly as collimated light.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

Figure 1:
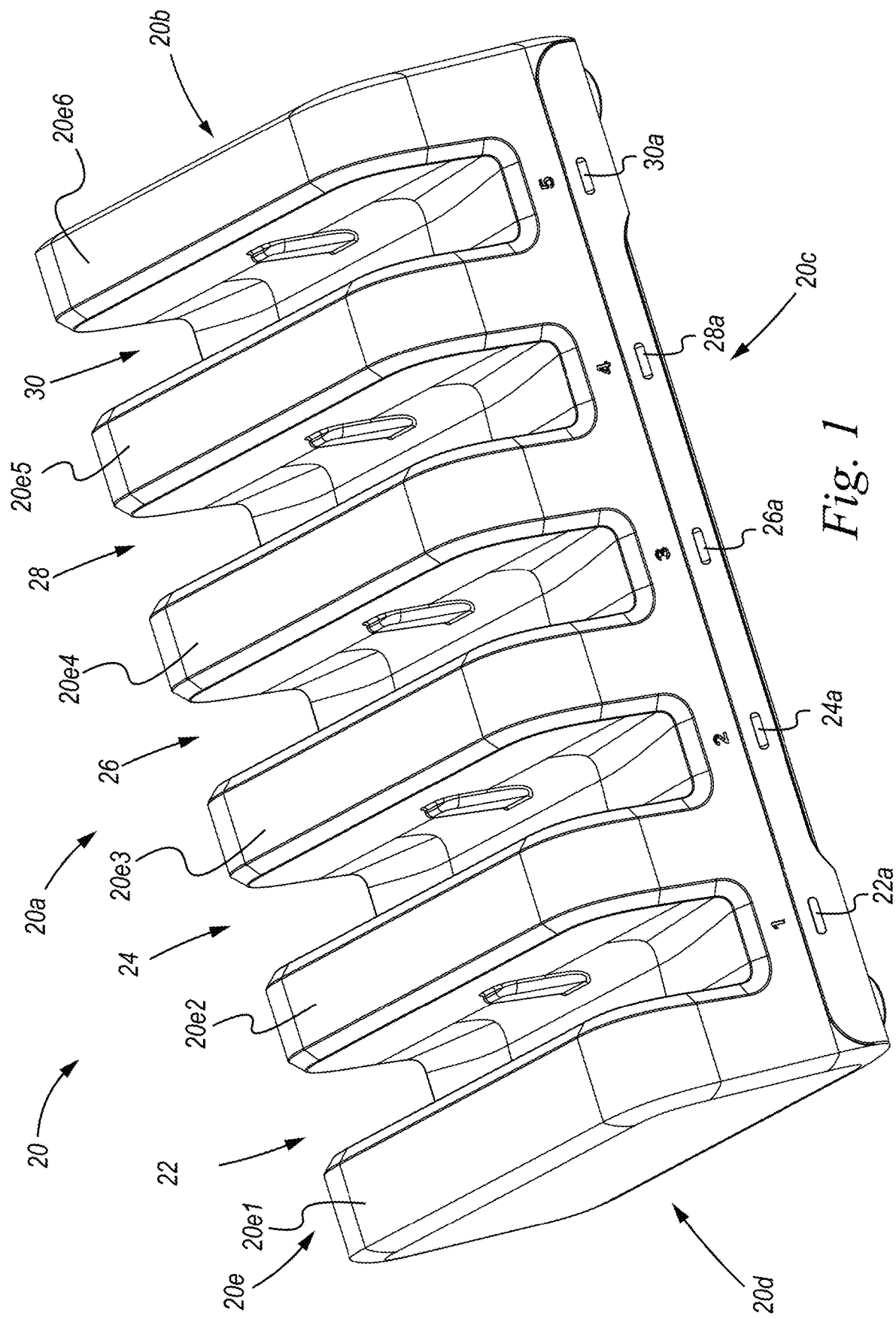
FIG. 1 is a top perspective view of a multi-bay portable electronic device charger assembly.

With reference now to the figures, shown are one or more examples of Charger System for Portable Electronic Devices, articles of manufacture, compositions of matter for same that may provide context, for instance, in introducing one or more processes and/or devices described herein.

DETAILED DESCRIPTION

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a top perspective view of multi-bay portable electronic device charger assembly 20. Depicted implementation of multi-bay portable electronic device charger assembly 20 is shown to include side 20a, end 20b, side 20c, end 20d, and upper portion 20e. Depicted implementation of upper portion 20e is shown to include divider wall 20e1, divider wall 20e2, divider wall 20e3, divider wall 20e4, divider wall 20e5, and divider wall 20e6.

Depicted implementation of multi-bay portable electronic device charger assembly 20 is shown to include device bay 22 with direct light emitter assembly 22a, device bay 24 with direct light emitter assembly 24a, device bay 26 with direct light emitter assembly 26a, device bay 28 with direct light emitter assembly 28a, and device bay 30 with direct light emitter assembly 30a. For purposes herein, direct light illuminates a focused particularly targeted area that stands out from its surroundings.

Figure 2:
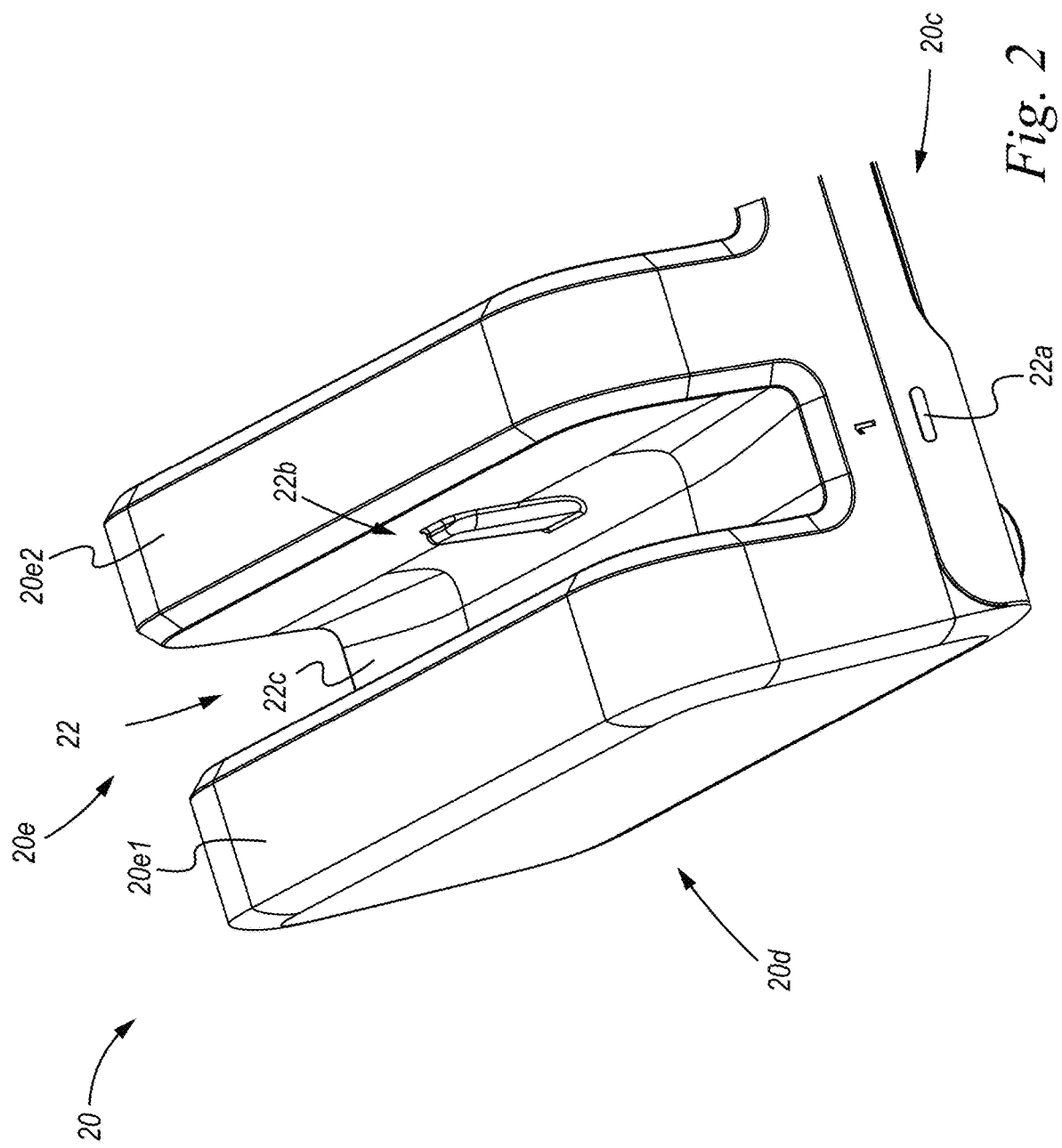
FIG. 2 is a top perspective partial view of a portion of the multi-bay portable electronic device charger assembly of FIG. 1.

Turning to FIG. 2, depicted therein is a top perspective partial view of a portion of multi-bay portable electronic device charger assembly 20. Depicted implementation of device bay 22 is shown to include protrusion 22b, and floor 22c.

Figure 3:
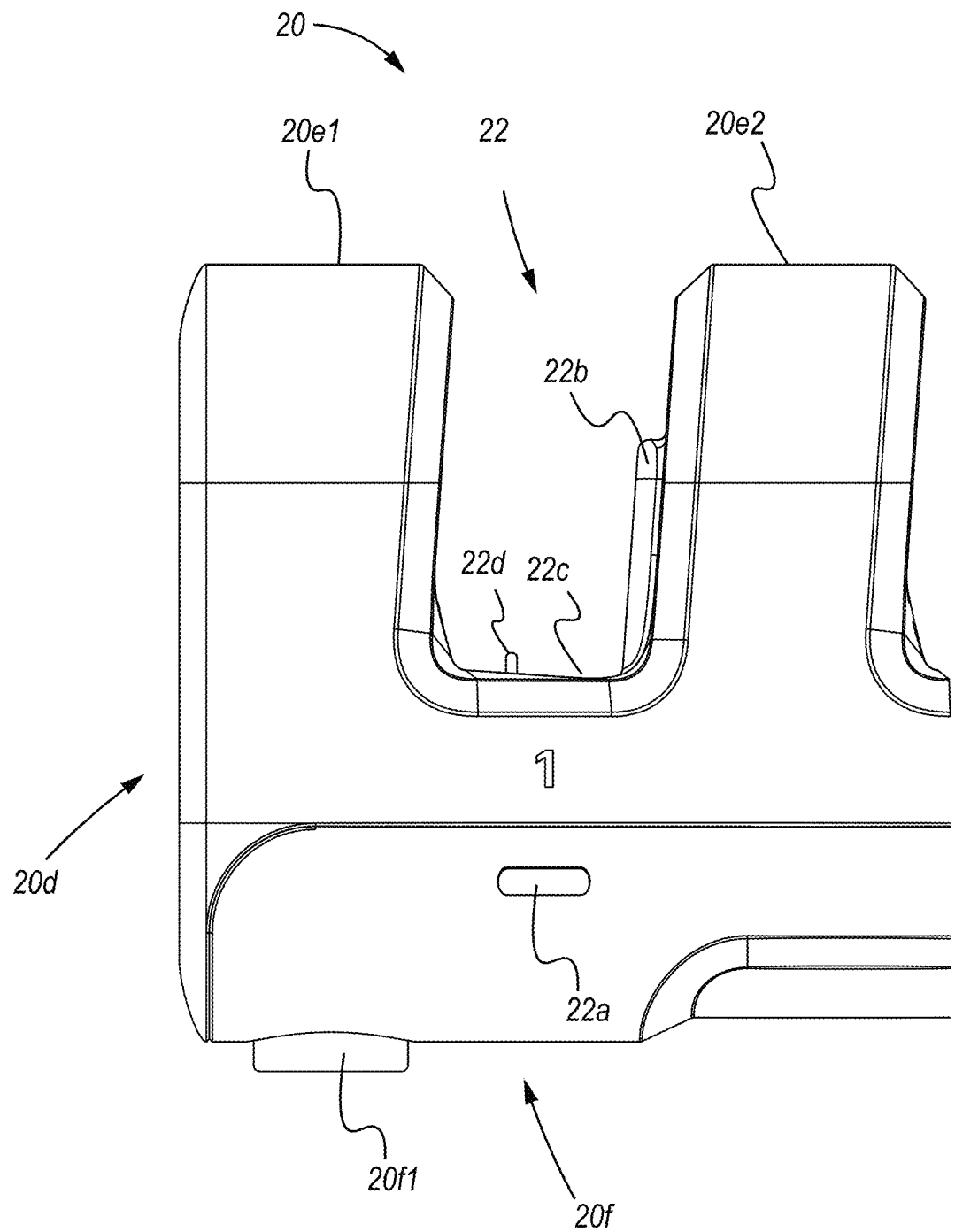
FIG. 3 is a side-elevational partial view of the portion of the multi-bay portable electronic device charger assembly of FIG. 2.

Turning to FIG. 3, depicted therein is a side-elevational partial view of the portion of multi-bay portable electronic device charger assembly 20 shown in FIG. 2 to include base assembly 20f with foot member 20f1. Depicted implementation of device bay 22 is shown to include electrical interface 22d, which is electrically couplable with a portable electronic device for electrical charging thereof.

Figure 4:
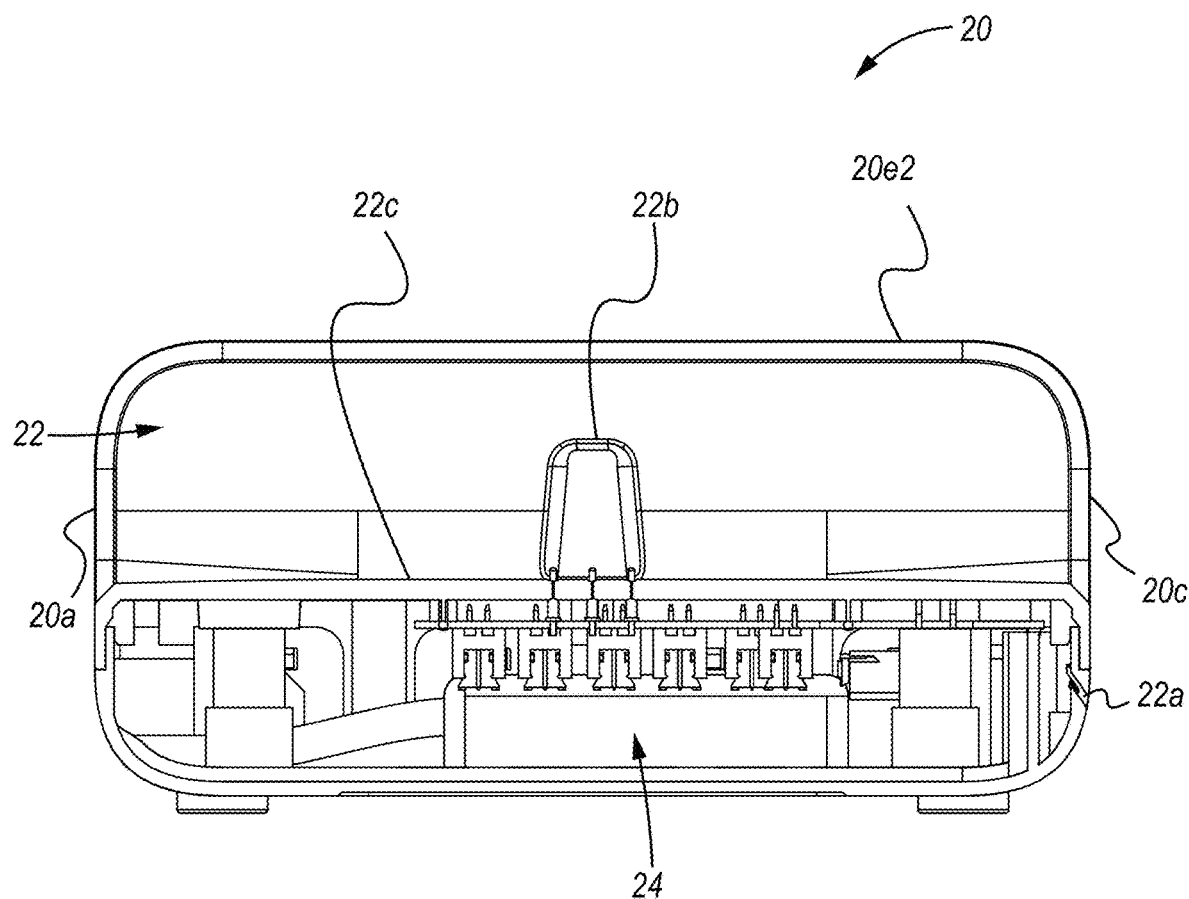
FIG. 4 is a front-elevational cross-sectional view of the multi-bay portable electronic device charger assembly of FIG. 1.

Turning to FIG. 4, depicted therein is a front-elevational cross-sectional view of multi-bay portable electronic device charger assembly 20, which is shown to include electrical control assembly 24 for controlling electrical charging of a portable electronic device that is electrically coupled to an electrical interface such as electrical interface 22d. In implementations electrical control assembly 24 is configured to control intensity, color, etc. of direct light emitted by one or more direct light emitter assemblies based on electrical charging status of one or more portable electronic devices being charged by multi-bay portable electronic device charger assembly 20.

Figure 5:
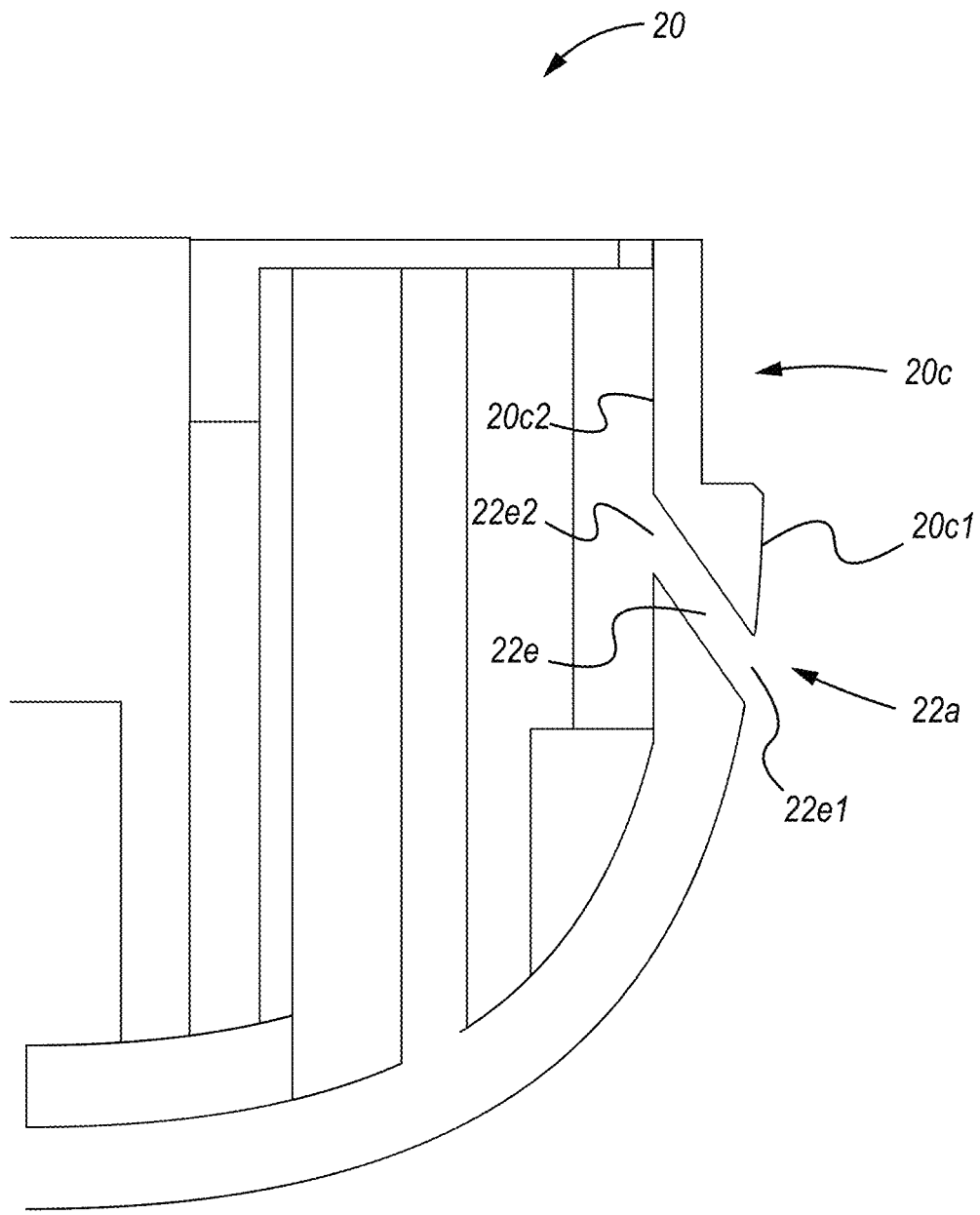
FIG. 5 is an enlarged portion of the front-elevational cross-sectional view of the multi-bay portable electronic device charger assembly shown in FIG. 4.

Turning to FIG. 5, depicted therein is an enlarged portion of the front-elevational cross-sectional view of multi-bay portable electronic device charger assembly 20 shown in FIG. 4. Depicted implementation of multi-bay portable electronic device charger assembly 20 is shown to include exterior surface 20c1 and interior surface 20c2.

Figure 6:
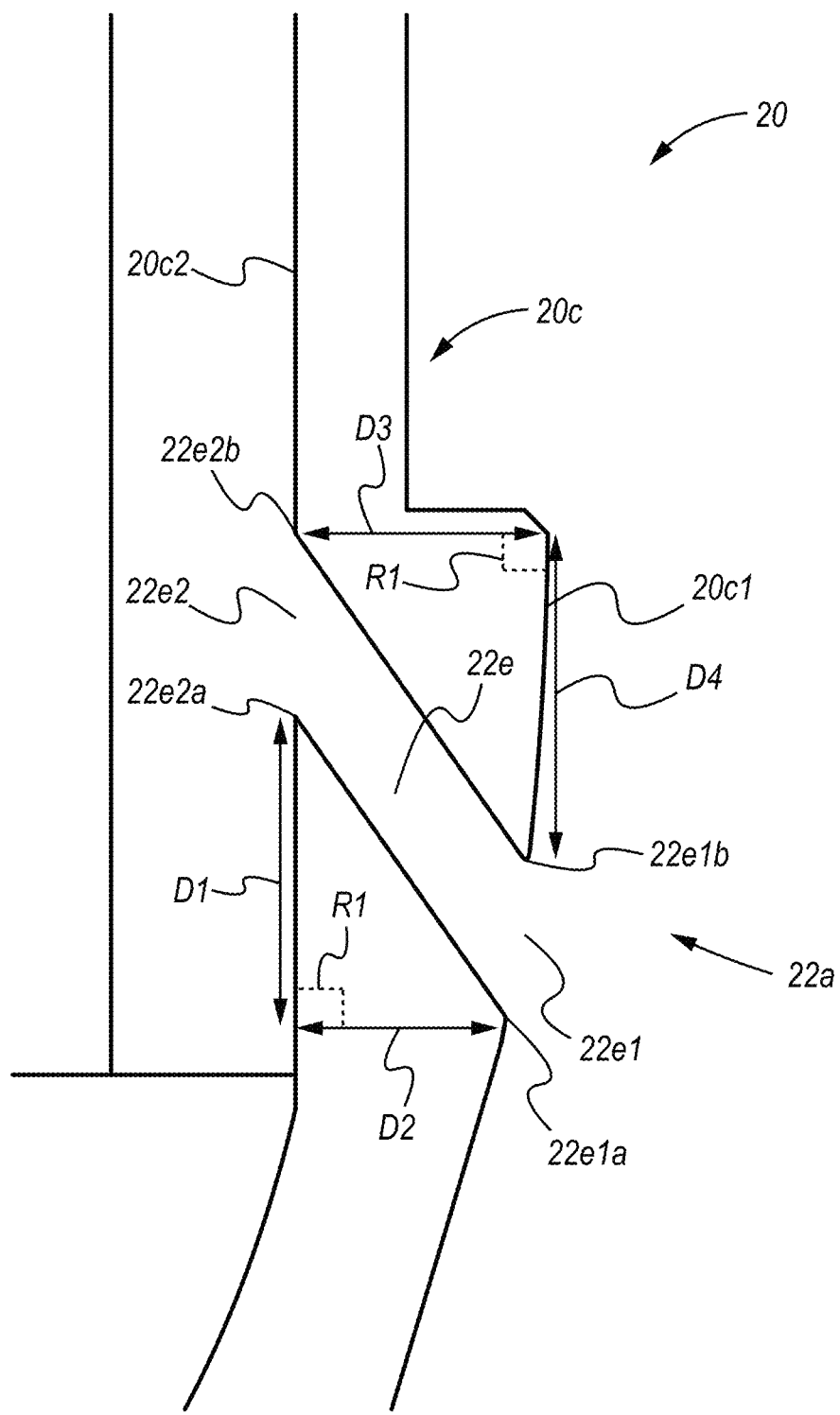
FIG. 6 is a further enlarged portion of the enlarged front-elevational cross-sectional view of the multi-bay portable electronic device charger assembly shown in FIG. 5.

Turning to FIG. 6, depicted therein is a further enlarged portion of the enlarged front-elevational cross-sectional view of multi-bay portable electronic device charger assembly 20 shown in FIG. 5. Depicted implementation of device bay 22 is shown to include corner 22e1a, corner 22e1b, corner 22e2a, corner 22e2b, distance D1, distance D2, distance D3, and distance D4, perpendicular reference R1, and perpendicular reference R2.

Figure 7:
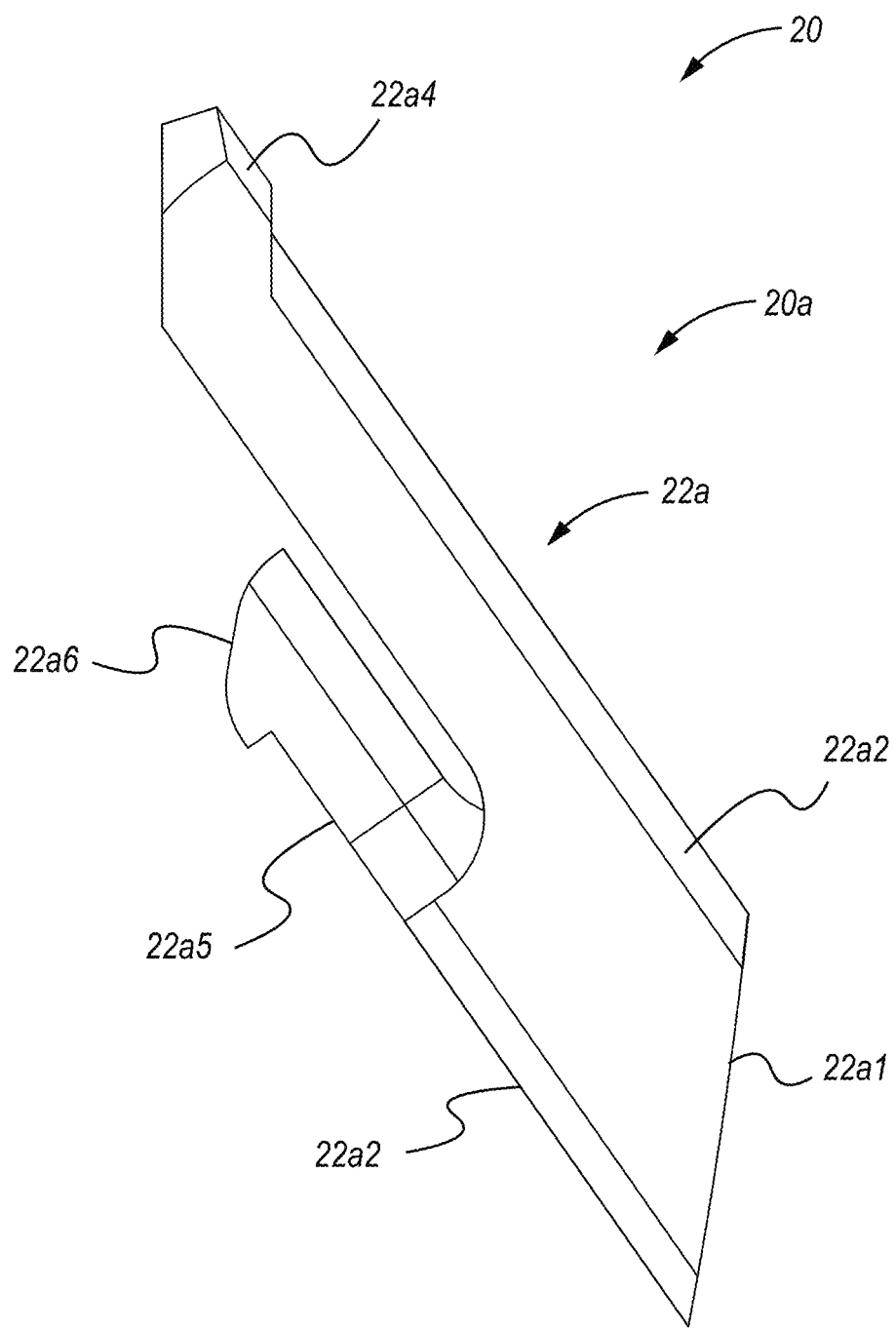
FIG. 7 is a perspective view of a light emitter assembly.

Turning to FIG. 7, depicted therein is a perspective view of elongated portion 22a3. Depicted implementation of direct light emitter assembly 22a is shown to include direct light emitter 22a1 (such as a light emitting diode, columnated light emitter, lens-focused, etc.), housing 22a2, elongated portion 22a3, catch portion 22a4, elongated portion 22a5, and catch portion 22a6. In implementations direct light emitter assembly 22a is configured to emit direct light in at least a portion of the visible light spectrum when activated by electrical control assembly 24. In implementations direct light emitter 22a1, with direct light emitter assembly 22a, is positioned to emit direct light at least 30 degrees downward from horizontal when base assembly 20f with foot member 20f1 base of multi-bay portable electronic device charger assembly 20 is positioned upon a horizontally oriented surface.

Figure 8:
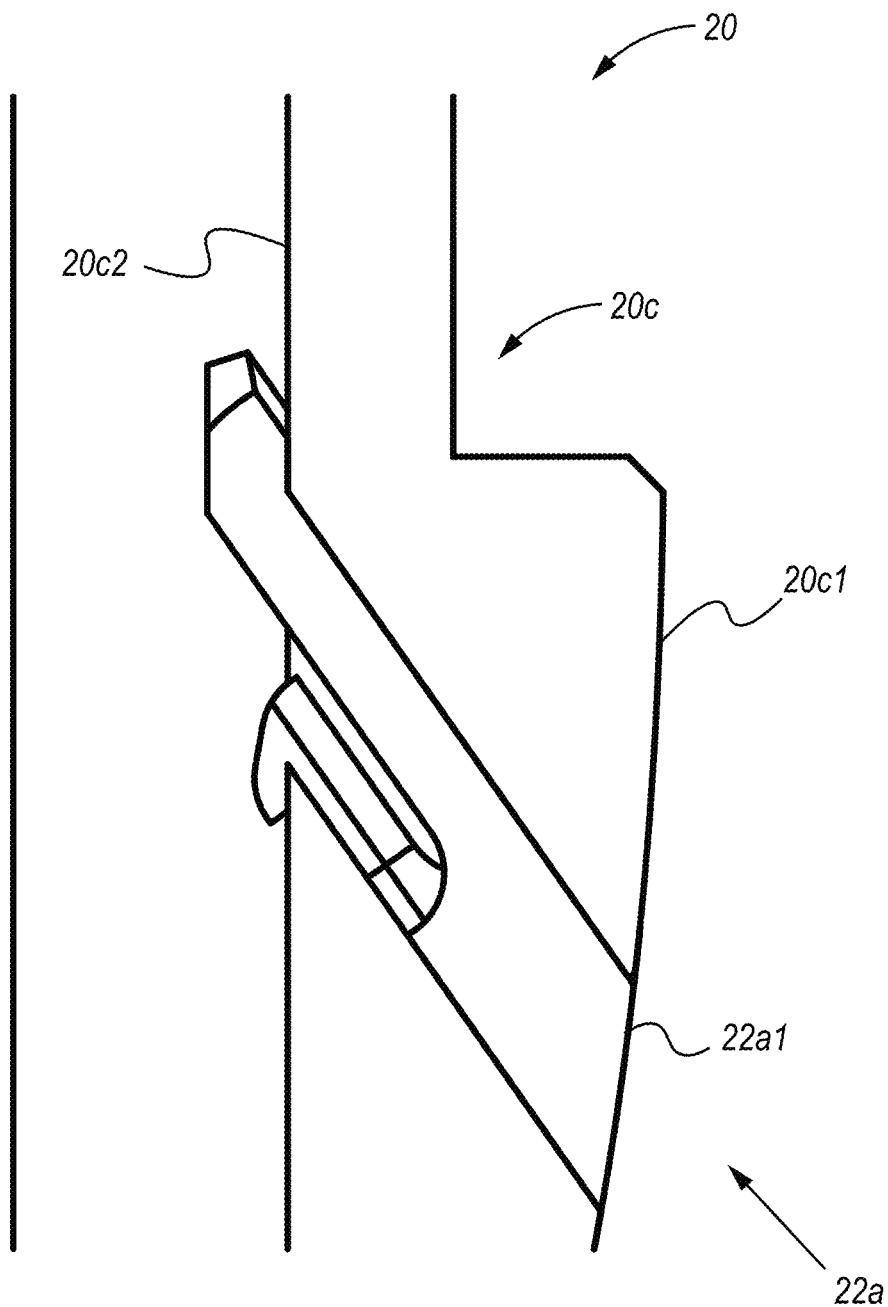
FIG. 8 is the further enlarged portion of the enlarged front-elevational cross-sectional view of the multi-bay portable electronic device charger assembly shown in FIG. 5 also including the light emitter assembly of FIG. 7 as inactive.

Turning to FIG. 8, depicted therein is the further enlarged portion of the enlarged front-elevational cross-sectional view of a portion of multi-bay portable electronic device charger assembly 20 shown in FIG. 5 also including elongated portion 22a3 as inactive.

Figure 9:
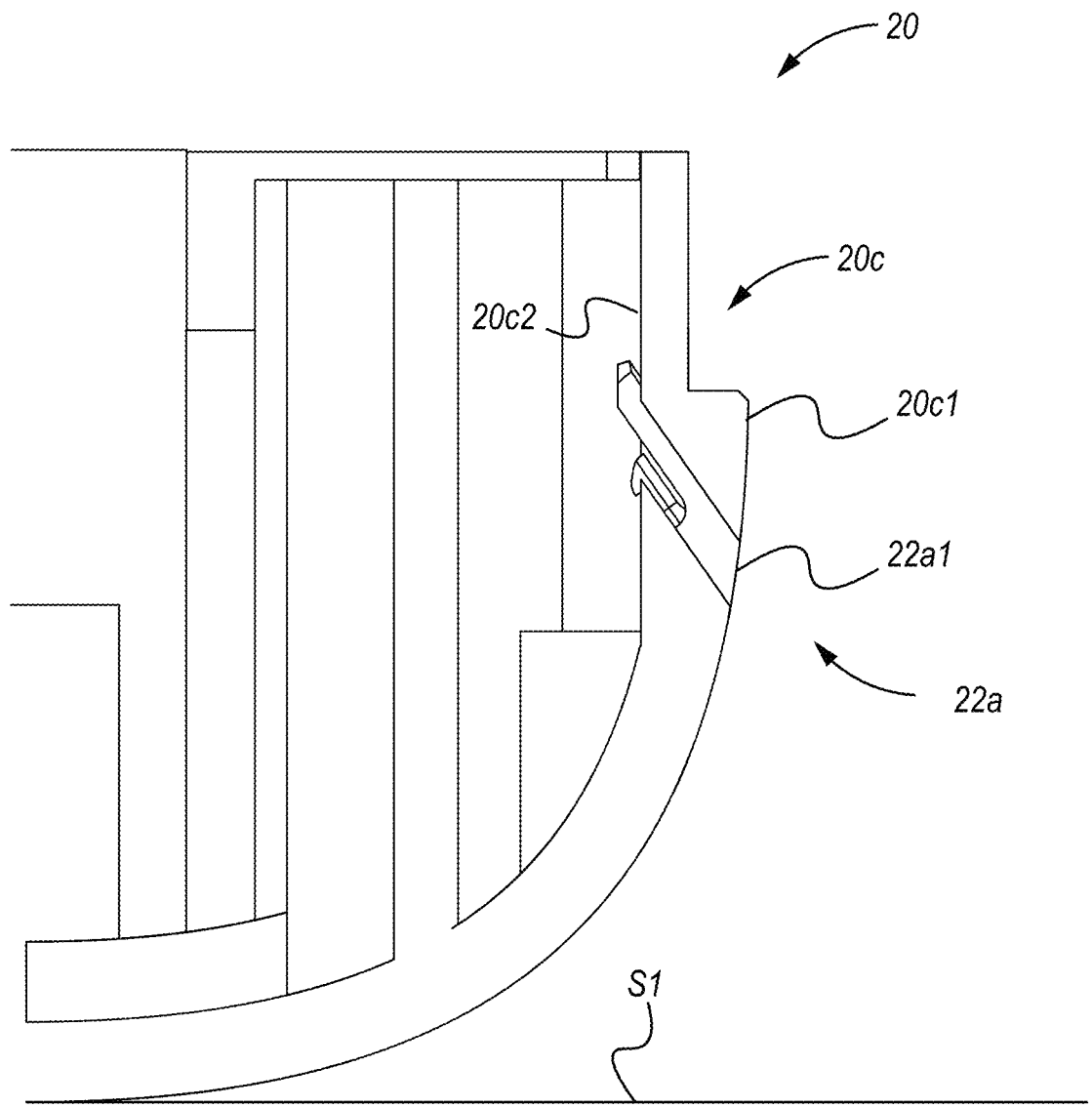
FIG. 9 is the enlarged portion of the front-elevational cross-sectional view of the multi-bay portable electronic device charger assembly shown in FIG. 5 also including the light emitter assembly of FIG. 7 as inactive.

Turning to FIG. 9, depicted therein is the enlarged portion of the front-elevational cross-sectional view of multi-bay portable electronic device charger assembly 20 shown in FIG. 5 also including elongated portion 22a3 as inactive condition and showing horizontal surface S1.

Figure 10:
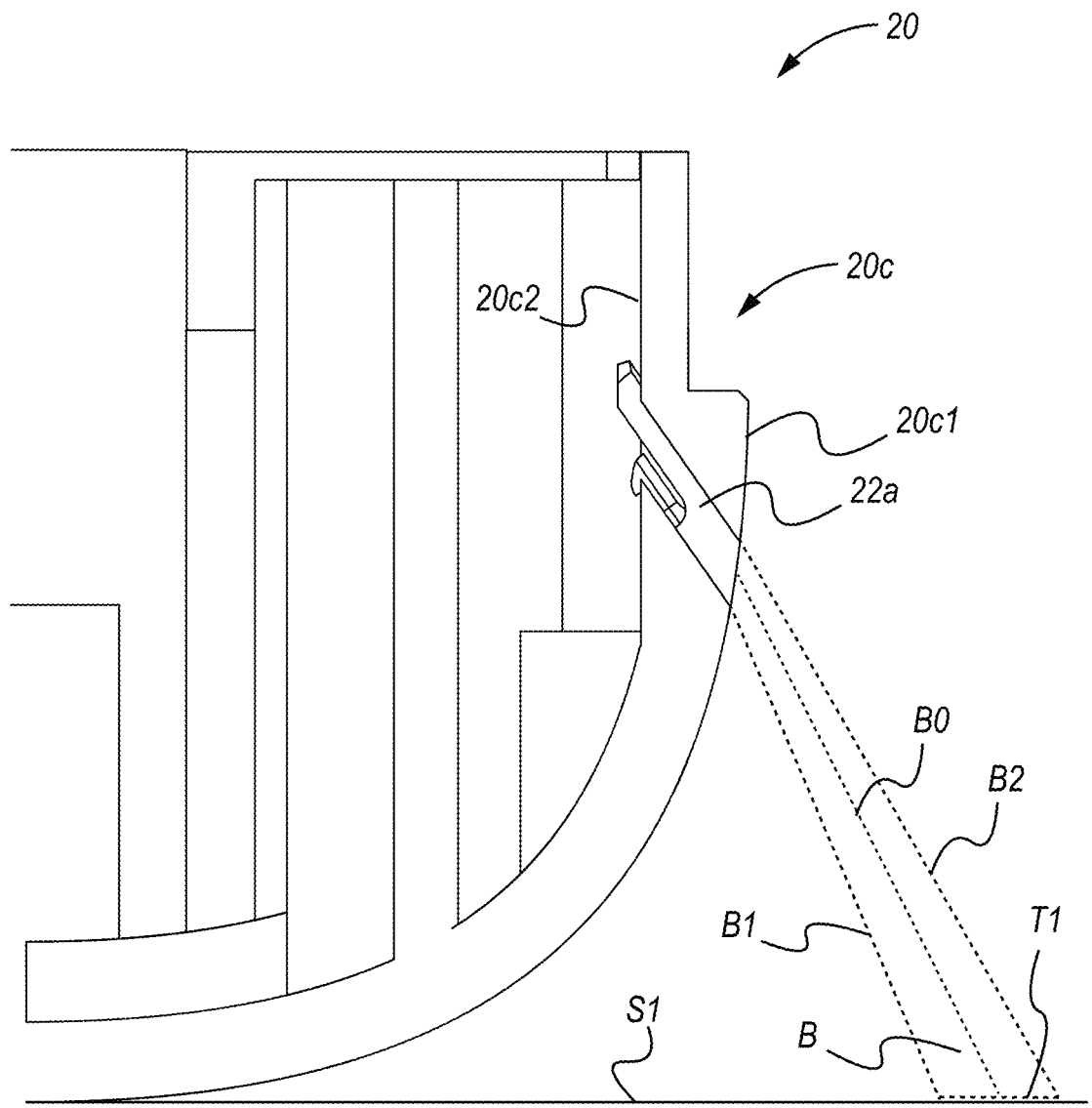
FIG. 10 is the enlarged portion of the front-elevational cross-sectional view of the multi-bay portable electronic device charger assembly shown in FIG. 5 also including the light emitter assembly of FIG. 7 as active.

Turning to FIG. 10, depicted therein is the enlarged portion of the front-elevational cross-sectional view of multi-bay portable electronic device charger assembly 20 shown in FIG. 5 also including elongated portion 22a3 as active with direct light B having direct light edge B1 and direct light edge B2 being projected onto illuminated horizontal surface portion T1 of horizontal surface S1 without other portions of horizontal surface S1 being illuminated by direct light B.

Figure 11:
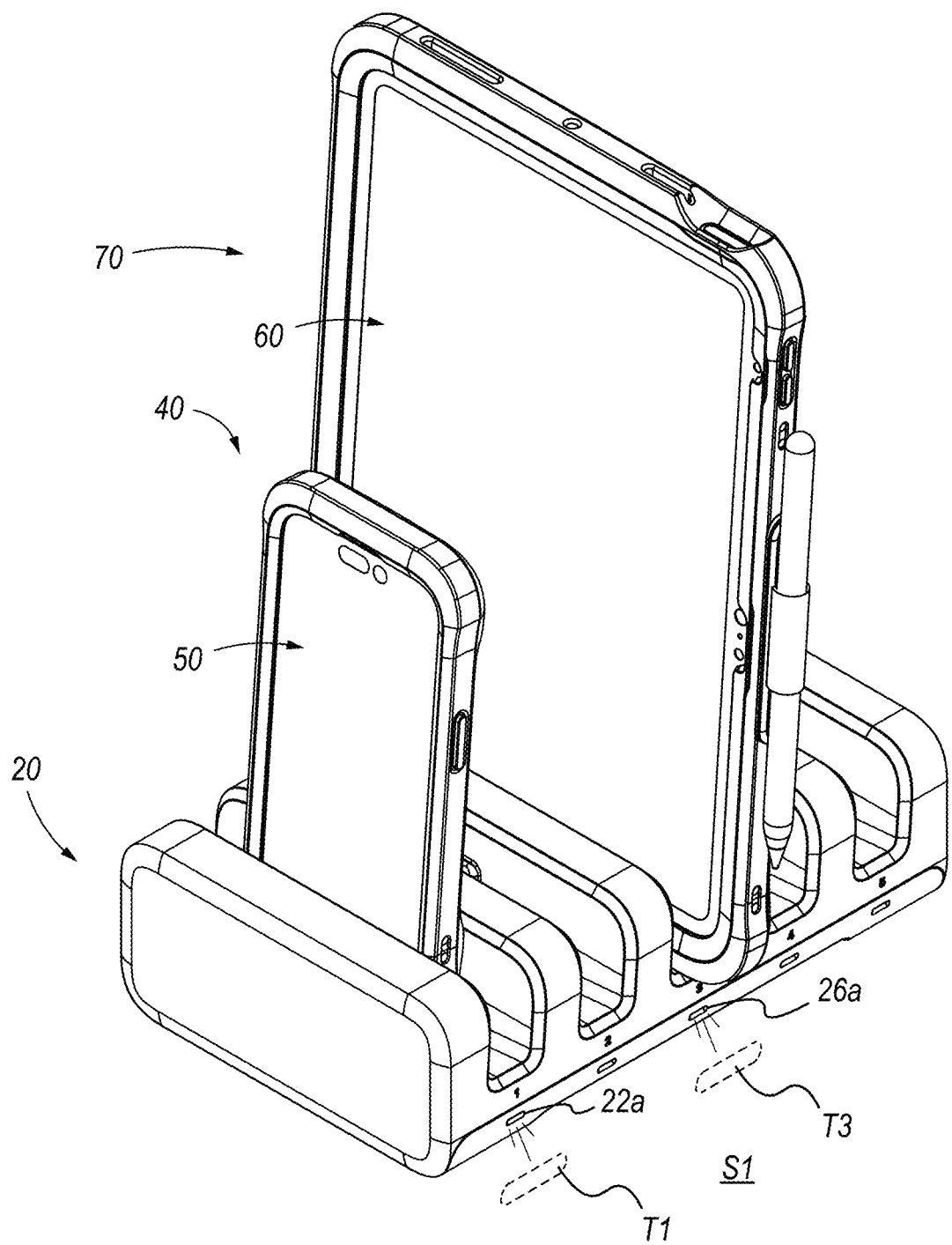
FIG. 11 is a top perspective view of the multi-bay portable electronic device charger assembly of FIG. 1 as charging two portable electronic devices.

Turning to FIG. 11, depicted therein is a top perspective view of multi-bay portable electronic device charger assembly 20 with portable electronic phone case 40 coupled with portable electronic phone 50 thereby coupled with device bay 22 of multi-bay portable electronic device charger assembly 20 wherein direct light emitter assembly 22a of device bay 22 is shown illuminating illuminated horizontal surface portion T1. Also depicted is portable electronic tablet case 60 coupled with portable electronic tablet 70 thereby coupled with device bay 26 of multi-bay portable electronic device charger assembly 20 wherein direct light emitter assembly 26a of device bay 26 is shown illuminating illuminated horizontal surface portion T3.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A portable electronic device charger system for electrical charging of at least a first portable electronic device, the portable electronic device charger system comprising:
   (I) a first electrical interface electrically couplable with the first portable electronic device;
   (II) a first electronic control assembly for controlling electrical charging of the portable electronic device charger system with the first portable electronic device when the first portable electronic device is electrically coupled with the first electrical interface;
   (III) a first direct light emitter assembly containing a first direct light emitter configured to emit direct light in at least a portion of the visible light spectrum when activated by the first electronic control assembly; and
   (IV) a base assembly,
   wherein when the portable electronic device charger system is positioned upon a first portion of a horizontally oriented surface and when the first direct light emitter is activated, the direct light of the first direct light emitter is emitted onto a second portion of the horizontally oriented surface to illuminate the second portion wherein the first portion and a third portion of the horizontally oriented surface adjacent to the second portion remain unilluminated by the direct light being emitted by the first direct light emitter.

2. The system of claim 1,
   wherein the first direct light emitter of the first direct light emitter assembly includes a direct light emitting diode.

3. The system of claim 1, further including
   (I) at least one second electrical interface electrically couplable with at least one second portable electronic device;
   (II) at least one second electronic control assembly for controlling electrical charging of the portable electronic device charger system with the at least one second portable electronic device when the at least one second portable electronic device is electrically coupled with the at least one second electrical interface; and
   (III) at least one second direct light emitter assembly containing at least one second direct light emitter configured to emit direct light in at least a portion of the visible light spectrum when activated by the at least one electronic control assembly.

4. The system of claim 1,
   wherein the first electronic control assembly is configured to control the direct light emitted by the first direct light emitter based on the electrical charging status of the first portable electronic device being electrically charged by the portable electronic device charger system.

5. The system of claim 4,
   wherein the first electronic control assembly is configured to control intensity of the direct light emitted by the first direct light emitter based on electrical charging status of the first portable electronic device being electrically charged by the portable electronic device charger system.

6. The system of claim 5,
   wherein the first electronic control assembly is configured to control color of the direct light emitted by the first direct light emitter based on electrical charging status of the first portable electronic device being electrically charged by the portable electronic device charger system.

7. The system of claim 1,
   wherein the first electronic control assembly is configured for controlling electrical charging of the first portable electronic device when the first portable electronic device is electrically coupled with the first electrical interface.

8. The system of claim 1 further including a side having an exterior surface and an interior surface,
   wherein the side includes an aperture extending from an opening through the interior surface through to an opening through the exterior surface downward away from a horizontal orientation in a direction toward the second portion of the horizontally oriented surface when the base of the portable electronic device charger system is positioned upon the first portion of horizontally oriented surface, and
   wherein the first direct light emitter is sized and shaped to couple with the aperture.

9. The system of claim 1, further including a side having an exterior surface and an interior surface,
   wherein the side includes an aperture extending from an opening through the interior surface through to an opening through the exterior surface, and
   wherein the opening through the interior surface is distanced farther away from the base assembly than the opening through the exterior surface is distanced from the base assembly, and
   wherein the first direct light emitter is sized and shaped to couple with the aperture.

10. The system of claim 9,
    wherein the first direct light emitter assembly includes at least one catch portion removably couplable with the interior surface of the side.

11. The system of claim 1,
    wherein the first direct light emitter assembly is adjustably positionable to adjust location of the second portion of the horizontally oriented surface when the portable electronic device charger system is positioned upon a first portion of a horizontally oriented surface.

12. The system of claim 1,
    wherein the first direct light emitter assembly is positioned to emit the direct light at least 30 degrees downward from horizontal when the base of the portable electronic device charger system is positioned upon the first portion of the horizontally oriented surface.

13. The system of claim 1,
    wherein the first direct light emitter emits direct light as collimated light when activated by the first electronic control assembly.

14. The system of claim 1,
    wherein the first direct light emitter includes at least one lens configured to emit the direct light when activated by the first electronic control assembly as focused light.

15. A portable electronic device charger system for electrical charging of at least one portable electronic device, the portable electronic device charger system comprising:

(I) at least one electrical interface electrically couplable with the at least one portable electronic device;

(II) at least one electronic control assembly for controlling electrical charging of the portable electronic device charger system with the at least one portable electronic device when the at least one portable electronic device is electrically coupled with the at least one electrical interface;

(III) at least one direct light emitter assembly configured to project at least one amount of light when activated by the at least one electronic control assembly; and (IV) a base assembly, wherein the at least one direct light emitter assembly is positioned to project at least a majority of the at least one amount of light in a direction onto a first portion of a horizontally oriented surface when the base of the portable electronic device charger system is positioned upon a second portion of the horizontally oriented surface, wherein the at least one direct light emitter assembly is adjustably positionable to adjust location of the at least a majority of the at least one amount of light projected onto the first portion of the horizontally oriented surface when the base of the portable electronic device charger system is positioned upon the second portion horizontally oriented surface.

16. The system of claim 15 further including a side having an exterior surface and an interior surface, wherein the side includes at least one aperture extending from at least one opening through the interior surface through to at least one opening through the exterior surface, wherein the at least one opening through the interior surface is distanced farther away from the base assembly than the at least one opening through the exterior surface is distanced from the base assembly, and wherein the at least one direct light emitter assembly is sized and shaped to couple with the at least one aperture.

* * * * *